UNITED STATES PATENT OFFICE.

DANIEL MINTHORN, OF WATERTOWN, NEW YORK, ASSIGNOR TO M. N. MINTHORN, OF SAME PLACE.

METHOD OF TREATING VEGETABLE FIBER FOR MANUFACTURE OF PAPER-PULP.

SPECIFICATION forming part of Letters Patent No. 319,295, dated June 2, 1885.

Application filed April 11, 1884. (No specimens.)

*To all whom it may concern:*

Be it known that I, DANIEL MINTHORN, of Watertown, in the county of Jefferson and State of New York, have invented new and useful Improvements in the Method of Treating Vegetable Fiber for the Manufacture of Paper-Pulp, &c., of which the following is a specification.

This invention has the object to remove silica and other impurities or objectionable substances from vegetable fibrous material in the manufacture of paper-pulp, and for preparing such material for spinning and for other uses. Silica and compounds containing silica form a considerable portion of the substances contained in the grasses—such as hemp, flax, esparto grass, and others which are largely used in the industrial arts.

My invention is designed to furnish ready means for eliminating the silicious substances, either wholly or partially, from the vegetable fibers, as may be necessary in order to properly prepare the vegetable fiber for manufacture into the ultimate products which it is intended to produce.

My invention consists, to that end, principally in treating the vegetable fiber with a solvent containing hydrofluoric acid and sulphurous acid, as will be hereinafter fully set forth, and pointed out in the claims.

In practicing my invention sulphurous-acid gas is generated by roasting pyrites or burning sulphur in any ordinary or suitable reverberatory furnace. When the generation of sulphurous-acid gas is fairly established, I add to the charge in the furnace pulverized fluor-spar by sprinkling the same over the pyrites or sulphur. The fluor-spar is decomposed by the heat and the hot sulphurous-acid gas and hydrofluoric acid is liberated. The gases so generated in the furnace are drawn off by a suitable fan or pump, and forced into a tank or receptacle containing milk of lime, whereby a solution of hydrofluo sulphite or bisulphite of calcium is formed. The fan or pump and the passages through which the gases are drawn are lined or covered with lead to resist the corroding action of the gases. The end of the blast-pipe of the fan or pump arranged in said tank is finely perforated to distribute the gas as uniformly as possible through the liquid. When the milk of lime has been completely converted into a solution of hydrofluo sulphite or bisulphite of calcium the liquid is ready for use and applied to the treatment of the vegetable fiber in an ordinary digester under the usual conditions of heat, motion, and pressure.

When the material treated is to be used for paper-stock, the digestion is carried on for a longer period of time than when the material is merely prepared for spinning. This liquid not only destroys and removes the silicious compounds contained in the material, but also bleaches the same. After the liquid has been used in the digester in the above-described manner it is drained off into storing-vats, in which the stock to be treated is soaked in the spent liquid for several days at the ordinary temperature as a preliminary treatment preparatory to the treatment in the digester. When the spent liquid is no longer fit for this preliminary use, it may still be employed for removing hair from hides in tanning. When the intercellular cementing matter holding the fibers together does not indicate much silica, but is composed, chiefly, of mucilaginous and resinous substances, I add borax to the liquid or mineral borates to the charge in the furnace in order to produce a certain amount of fluoboric acid, whereby the mucilaginous or resinous matters are destroyed and the fibers correspondingly loosened.

The relative proportions of the constituent parts of the liquid solvent can be so regulated as to wholly destroy some of the cements holding the fibers together, while others are preserved to a greater or less degree, as may be most desirable in preparing the fiber for producing the desired ultimate product.

In making paper-pulp the material should be thoroughly disintegrated, while in preparing flax or hemp for spinning or other uses the disintegration should not be carried so far.

The treatment of the vegetable fiber with a solvent liquid containing hydrofluoric and sulphurous acid disintegrates the fibers more thoroughly and in less time than heretofore, and removes impurities which were left comparatively unchanged by the treatments heretofore employed.

I am aware that hydrofluoric acid has been employed in the treatment of vegetable fiber, and that sulphurous acid has been used for the same purpose; and I do not claim either of these treatments separately.

I claim as my invention—

1. The herein-described method of preparing vegetable fiber for the manufacture of paper-pulp and other uses which consists in treating the fiber with a solvent containing hydrofluoric and sulphurous acids, substantially as set forth.

2. The herein-described method of preparing vegetable fiber for the manufacture of paper-pulp and other uses which consists in treating the fiber with a solvent containing hydrofluoric, sulphurous, and boracic acids, substantially as set forth.

3. The herein-described method of preparing a solvent for the treatment of vegetable fiber which consists in generating sulphurous, hydrofluoric, and boracic acids in a suitable furnace and conducting the resulting gases through milk of lime, substantially as set forth.

DANIEL MINTHORN.

Witnesses:
SAMUEL FELT, Jr.,
ADDISON S. LOW.